United States Patent [19]

Yoshida et al.

[11] Patent Number: 5,671,196

[45] Date of Patent: Sep. 23, 1997

[54] METHOD FOR CONTROLLING A ROTATABLE OPTICAL DISK STORING MAGAZINE

[75] Inventors: Masanao Yoshida, Osaka; Tadahiro Mitani, Matsubara; Keiji Hirao, Moriguchi; Hitoshi Ogata, Sakai, all of Japan

[73] Assignee: Sanyo Electric Co., Ltd., Moriguchi, Japan

[21] Appl. No.: 685,487

[22] Filed: Jul. 24, 1996

[30] Foreign Application Priority Data

Apr. 30, 1996 [JP] Japan ........................... 8-109301

[51] Int. Cl.$^6$ ............................................... G11B 17/22
[52] U.S. Cl. ........................... 369/34; 369/37; 369/179
[58] Field of Search ........................... 369/37, 34, 35, 369/36, 178, 179, 267, 268, 270, 33

[56] References Cited

U.S. PATENT DOCUMENTS

| | | | |
|---|---|---|---|
| 5,214,628 | 5/1993 | Langman et al. | 369/37 |
| 5,235,579 | 8/1993 | Ross | 369/37 |
| 5,541,897 | 7/1996 | Baca et al. | 369/37 |

OTHER PUBLICATIONS

WO 87/07423, Miller, Multiple Disc Changer Apparatus Dec. 3, 1987.

*Primary Examiner*—Tan Dinh
*Attorney, Agent, or Firm*—Armstrong, Westerman, Hattori, McLeland & Naughton

[57] ABSTRACT

A magazine controlling method is disclosed for smoothly stopping a disk storing magazine. According to the method of the invention, the rotational speed of the disk storing magazine in rotation is reduced upon the magazine reaching a position a small distance short of a predetermined stop position, and the magazine is then stopped at the predetermined stop position.

5 Claims, 6 Drawing Sheets

METHOD FOR CONTROLLING A ROTATABLE OPTICAL DISK STORING MAGAZINE

FIELD OF THE INVENTION

The present invention relates to a method of controlling the rotation and stopping movement of a rotary magazine provided in a disk recording-playback device, the magazine being adapted to accommodate a plurality of disks serving as recording media.

BACKGROUND OF THE INVENTION

With regard to a disk recording-playback device for storing a plurality of disks (e.g., compact disks or the like), selectively recording and/or reproducing the disks, there is known a so-called carrousel type device wherein a magazine is adapted to store the disks as held in their upright position and arranged radially.

The present applicant filed a patent application with the Japanese Patent Office on Nov. 30, 1995 for this carrousel type recording-playback device shown in FIGS. 1 to 3. (Incidentally, the application and the disclosure thereof has not been laid open yet.)

The illustrated disk storing magazine 2 is formed with a plurality of groovelike storing portions 21 arranged radially for storing disks D therein. The magazine 2 is rotatably mounted on a chassis 10 with disks D accommodated in an upright position. As shown in FIGS. 2 and 3, the magazine 2 has along the periphery of its bottom plate a driving toothed portion 23, to which a drive motor 3 mounted on the chassis is coupled by means of a gear 32 provided with a pulley, and a belt 31. When energized, the drive motor 3 rotates the magazine 2.

The magazine 2 is further provided on the lower surface of its bottom plate with a stop ring 25 having recessed portions 25a equal in number to the number of disk storing portions 21. Disposed outside the stop ring 25 is a lock lever 4 engageable with the recessed portion 25a for stopping the rotation of the magazine 2. The lock lever 4 is always biased by a spring 42 in the direction of engagement and adapted to release the recessed portion 25a by a cam mechanism 41.

A disk inlet-outlet portion 13 is provided at one side of the path of rotational movement of the magazine. A recording-playback unit 18 by which signals are recorded on and reproduced from the disk is disposed inside a tubular body of the magazine and aligned with the portion 13 radially of the magazine.

When at a halt, the magazine is held locked with the lock lever 4 engaged in the recessed portion 25a.

When a disk is to be used for recording or playback or to be discharged, the disk storing portion having the disk accommodated therein needs to be revolved to a predetermined position, i.e., the position of the recording-playback unit 18 and the inlet-outlet portion 13, and stopped as opposed thereto. Further when a disk is to be placed into the magazine, an empty storing portion with no disk must be revolved to the position of the disk inlet-outlet portion 13 and stopped at this position. In this case, the cam mechanism 41 is operated first to disenagage the lock lever 4 from the recessed portion 25a for unlocking, and voltage is applied to the drive motor 3 to rotate the magazine 2. Upon the disk storing portion reaching the desired stop position, the drive motor is deenergized, and the cam mechanism 41 operates, moving the lock lever 4 toward the stop ring 25 into engagement with one of the recessed portions 25a, whereby the magazine is brought to a stop.

The voltage applied to the drive motor for rotating the magazine is maintained at a given voltage value V from the start of rotation until stoppage. Thus, the magazine rotates approximately at a constant speed from the start of rotation till the last.

With the disk recording-playback device, the time taken for selecting a disk is preferably shorter, so that there is a tendency for the magazine to be made rotatable at a higher speed. If the magazine is stopped by deenergizing the drive motor and operating the lock lever while rotating at a high speed, there arises the problem that a great impact acts on the lock lever and the stop ring owing to the inertia of the rotating magazine.

The object of the present invention is to disclose a magazine controlling method for smoothly stopping a disk storing magazine.

SUMMARY OF THE INVENTION

The disk storing magazine controlling method of the invention is adapted to reduce the rotational speed of a magazine in rotation upon the magazine reaching a position a small distance short of a predetermined stop position, allowing the magazine to move to the predetermined position at a low speed, and to stop the magazine smoothly at this position.

The expression, "the magazine reaching a position a small distance short of a predetermined stop position" means a state in which a disk storing portion preceding the selected disk storing portion, e.g., by 2 to 3 pitches has reached the stop position first.

The speed reduction and low-speed rotation of the magazine can be effected by lowering the voltage value to be applied to the drive motor. The overall weight of the magazine varies with the number of disks stored therein. To rotate the magazine at a nearly definite low speed upon a speed reduction regardless of the number of disks, the voltage value to be applied to the drive motor upon the speed reduction is changed according to whether the number of disk is great or small.

Stated more specifically, the number of disks stored in the magazine is detected in advance to judge whether the number of disks is greater or smaller than a predetermined number.

In the case where the number of disks has been recognized to be greater, a reference voltage value is applied to the drive motor to initiate the magazine into rotation, the voltage to be applied to the drive motor is changed from the reference voltage value to a first voltage value lower than the reference voltage value for a speed reduction upon the magazine reaching a position a small distance short of the stop position, and the magazine is thereafter brought to a halt at the desired stop position.

Alternately in the case where the number of disks has been recognized to be smaller, the voltage to be applied to the drive motor is changed from the reference voltage value to a second voltage value still lower than the first voltage value for a speed reduction upon the magazine reaching a position a small distance short of the stop position, and the magazine is thereafter brought to a halt at the desired stop position.

When a d.c. motor is used as the drive motor, it is desired to change the voltage value to be applied to the drive motor for a speed reduction by varying the pulse width and/or pulse period without varying the height of pulse waveform of the voltage to be applied to the drive motor, and thereby altering the average voltage. The reason is that if the voltage to be applied to the d.c. motor is merely lowered, the torque of the motor decreases, failing to rotate the magazine smoothly. The change in the voltage value is controlled by varying the pulse, whereby the rotational speed of the magazine can be reduced while maintaining the required toque. The above problem is therefore avoidable.

DETAILED DESCRIPTION OF THE INVENTION

An embodiment of the present invention will be described in detail with reference to the drawings. The disk recording-playback device 1 for use in the invention is equipped with a rotary magazine 2 for storing disks D as arranged radially in an upright position, and when the magazine 2 as rotated by the operation of a drive motor 3 is to be halted at a predetermined stop position, the voltage to be applied to the drive motor 3 is changed in accordance with the number of disks in the magazine 2 for a speed reduction so as to smoothly stop the magazine 2. Except for the magazine 2, the drive motor 3 and the components required for controlling these means, the device is the same as those already known and therefore will not be described.

In the embodiment to be described below, a d.c. motor is used as the drive motor, and the change in the voltage for a speed reduction of the magazine is effected by varying the pulse width and/or pulse period and thereby altering the average voltage.

Figure 1:
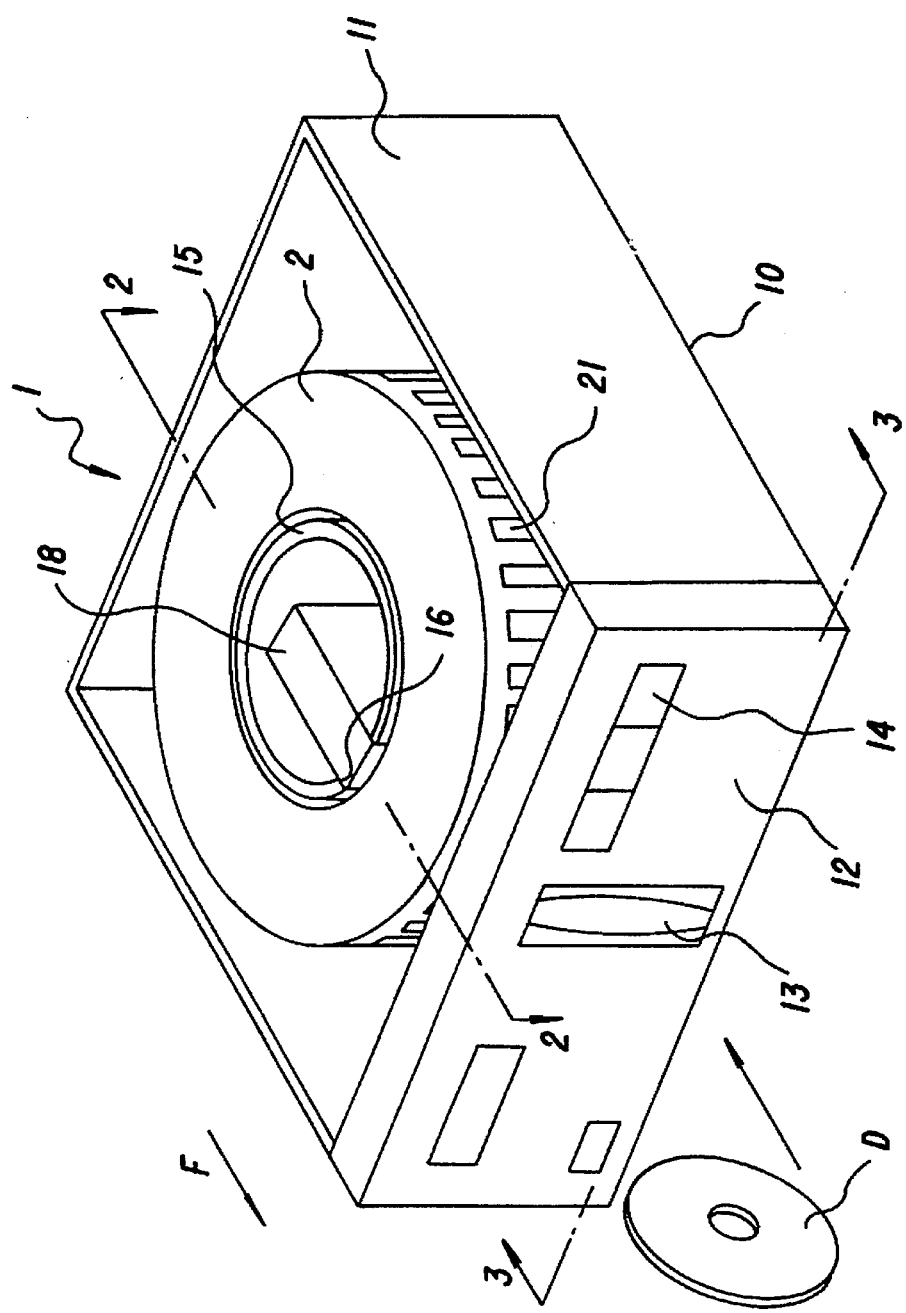
FIG. 1 is a perspective view showing a disk recording-playback device with a top plate thereof removed.

The magazine 2 is given a capacity to store up to 150 disks. The speed reduction before stopping the magazine is divided into four steps according to the number of disks stored in the magazine 2, and the voltage to be applied to the drive motor 3 is divided into a first voltage value V1 to a fourth voltage value V4 in corresponding relation to the steps. In connection with the disk recording-playback device 1 to be described below, the direction of arrow F in FIG. 1 toward the front panel shown in FIGS. 1 to 3 will be referred to as "front," and the opposite direction as "rear."

Description of Construction

The disk recording-playback device 1 is surrounded by a casing 11. The disk storing magazine 2 is rotatably mounted on a chassis 10 provided by the bottom plate of the casing 11.

The magazine 2 is a double tubular body providing 150 disk storing portions 21 arranged radially and each adapted to accommodate the disk D in an upright position. Each of the storing portions 21 is open radially. Through the opening, the disk moves between the magazine 2 and the disk inlet-outlet portion 13 or recording-playback unit 18 to be described below. The storing portions 21 have respective grooves in a bottom plate of the magazine, and the grooved portions bear groove numbers, No. 1 to No. 150, as arranged in a counterclockwise direction.

The magazine 2 has an inner lower end rotatably in engagement with an annular support post 15 provided upright on the chassis 10. A cutout 16 is formed in a front portion of the support post 15. Through the cutout 16, the disk D is movable between the magazine 2 and the disk recording-playback unit 18 to be described below.

Figure 2:
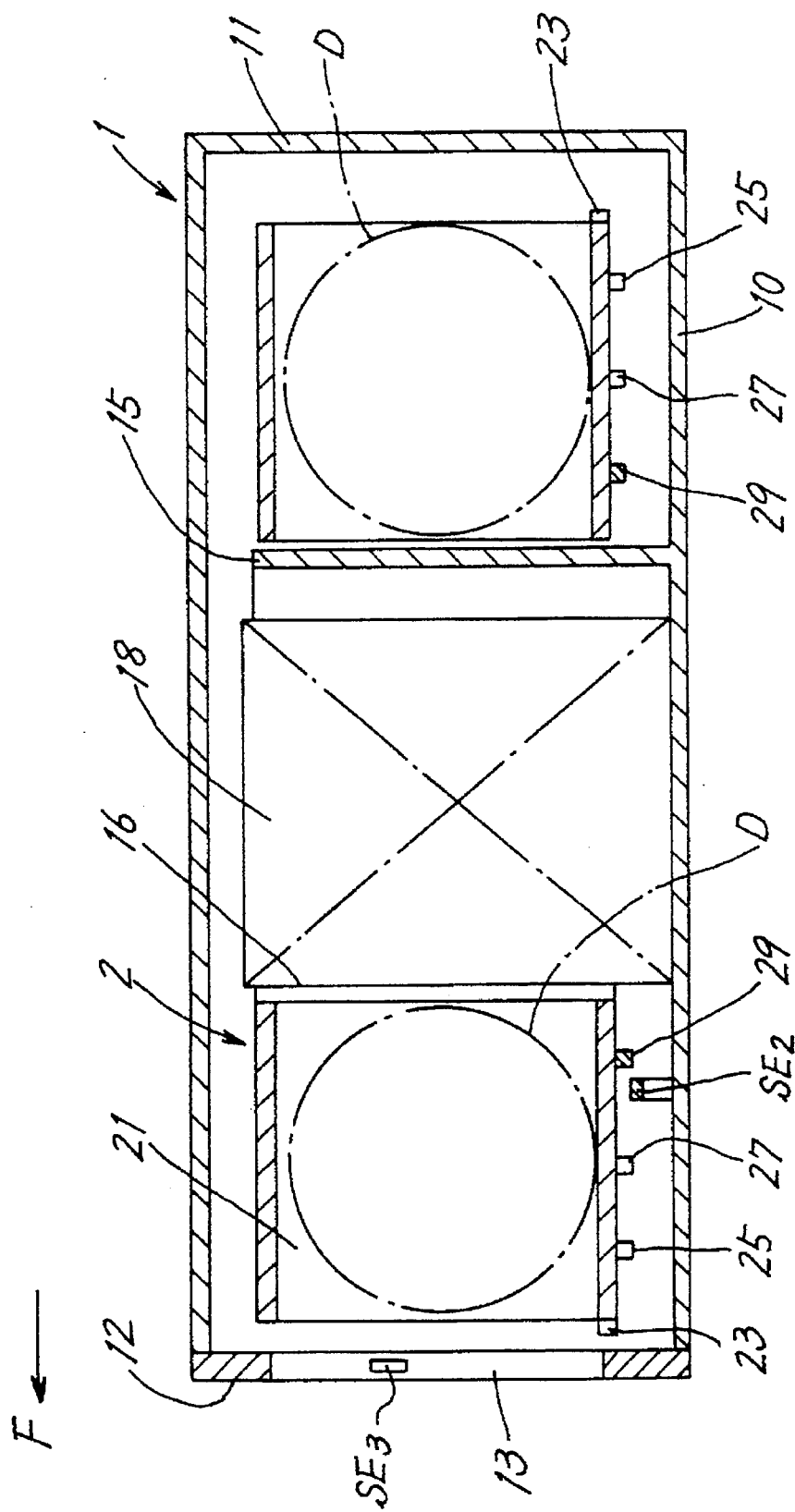
FIG. 2 is a view in section taken along the line X—X in FIG. 1.
Figure 3:
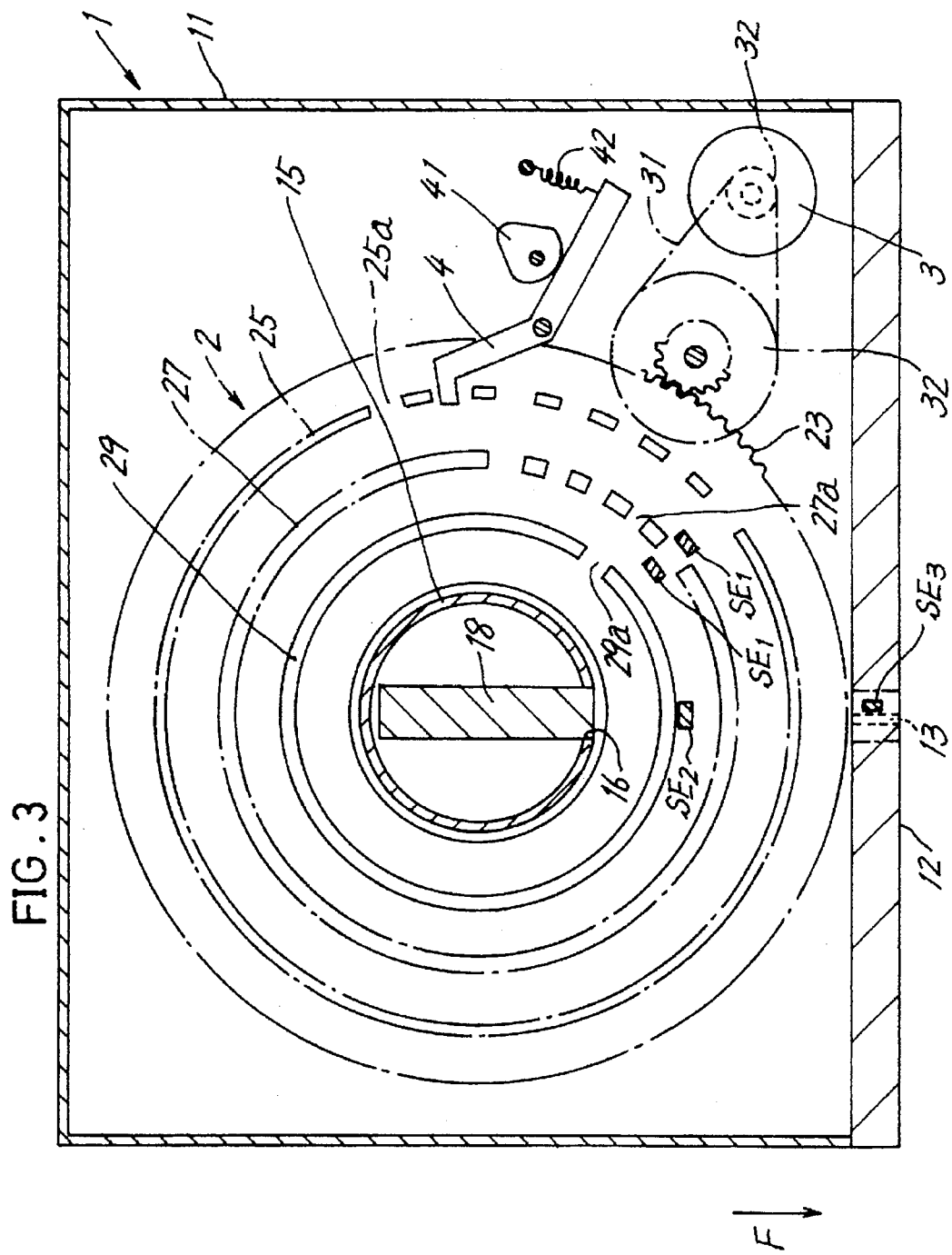
FIG. 3 is a view in section taken along the line Y—Y in FIG. 1 and showing the device as it is seen from below upward.

As shown in FIGS. 2 and 3, a drive toothed portion 23 is formed along the periphery of bottom of the magazine 2. Mounted on the chassis is a gear 32 having a pulley at a lower portion thereof and a toothed portion meshing with the drive toothed portion 23. The gear 32 is coupled by a belt 31 to the drive motor 3 which is mounted on the chassis. The drive motor 3 is controlled by a command from the control unit 5 to be described below and rotates the magazine 2 when driven, moving the disk storing portion 21 to a desired position.

The magazine 2 is provided on the bottom lower surface thereof with a stop ring 25, a position detecting ring 27 and an initial position recognizing ring 29 which are concentric with the toothed portion 23. Each of the rings is in the form of an annular ridge.

The stop ring 25, which is the outermost of the annular ridges, is formed with recessed portions 25a equidistantly spaced apart and equal in number to the number of disk storing portions 21. Disposed at one side of the periphery of the stop ring 25 is a lock lever 4 supported on the chassis and engageable with one of the recessed portions 25a for stopping the magazine 2 in rotation. The lock lever 4 is always biased by a spring 42 into bearing contact with the periphery of cam of a cam mechanism 41, and is movable into and out of the recessed portion 25a of the stop ring 25 by the operation of the cam mechanism 41. The cam mechnism 41 is rotatable by a lock lever motor 44 (FIG. 4) coupled to the control unit to be described below.

The position detecting ring 27, which is the annular ridge provided inward of the stop ring 25, has detection windows 27a equal in number to the number of the disk storing portions 21 and each in the form of a cutout. The ring 27 is provided with a position sensor SE1 comprising a pair of photocouplers arranged on opposite sides of the row of detection windows 27a. On detecting the passage of one detection window 27a with the rotation of the magazine 2, the sensor SE1 feeds a detection signal to the control unit 5. Accordingly, the detection of one window 27a by the sensor SE1 indicates that the magazine 2 has moved by one groove pitch.

The initial position recognizing ring 29 is the innermost of the annular ridges. This ridge is formed with a window 29a for detecting an initial position, at a position corresponding to the groove No. 1. The control unit 5 to be described later includes a memory 52 which has stored therein the fact that the window 29a corresponds to the storing portion 21 with the groove No. 1. An initial position recognizing sensor SE2 for detecting the window 29a is provided on the chassis in proximity with the ring 29. When the window 29a is detected by the sensor SE2 with the magazine 2 brought into rotation by turning on the power source, a detection signal is similarly fed to the, control unit 5, whereby the position of the groove No. 1 is recognized. A particular amount of rotation of the magazine 2 from the position of the groove No. 1 thus detected can be indicated by the number of position detecting windows 27a counted by the sensor SE1.

A front panel 12 providing various operation buttons 14, etc. is disposed on the front side of the casing 11. The front panel 12 has in its center a known disk inlet-outlet portion 13 formed with a vertical opening as opposed to one of the storing portions 21 of the magazine 2. The inlet-outlet portion 13 is provided with an incoming-outgoing sensor SE3 for detecting the insertion and discharge of the disk. The detection signal of the sensor SE3 is fed to the control unit 5.

The aforementioned recording-playback unit 18 by which signals are recorded on and reproduced from disks D is disposed inside the tubular body of the magazine 2. The unit 18 is in alignment with the inlet-outlet portion 13 with the magazine 2 interposed therebetween. The construction of the recording-playback unit and the disk loading-unloading mechanism are known and will not be described.

Figure 4:
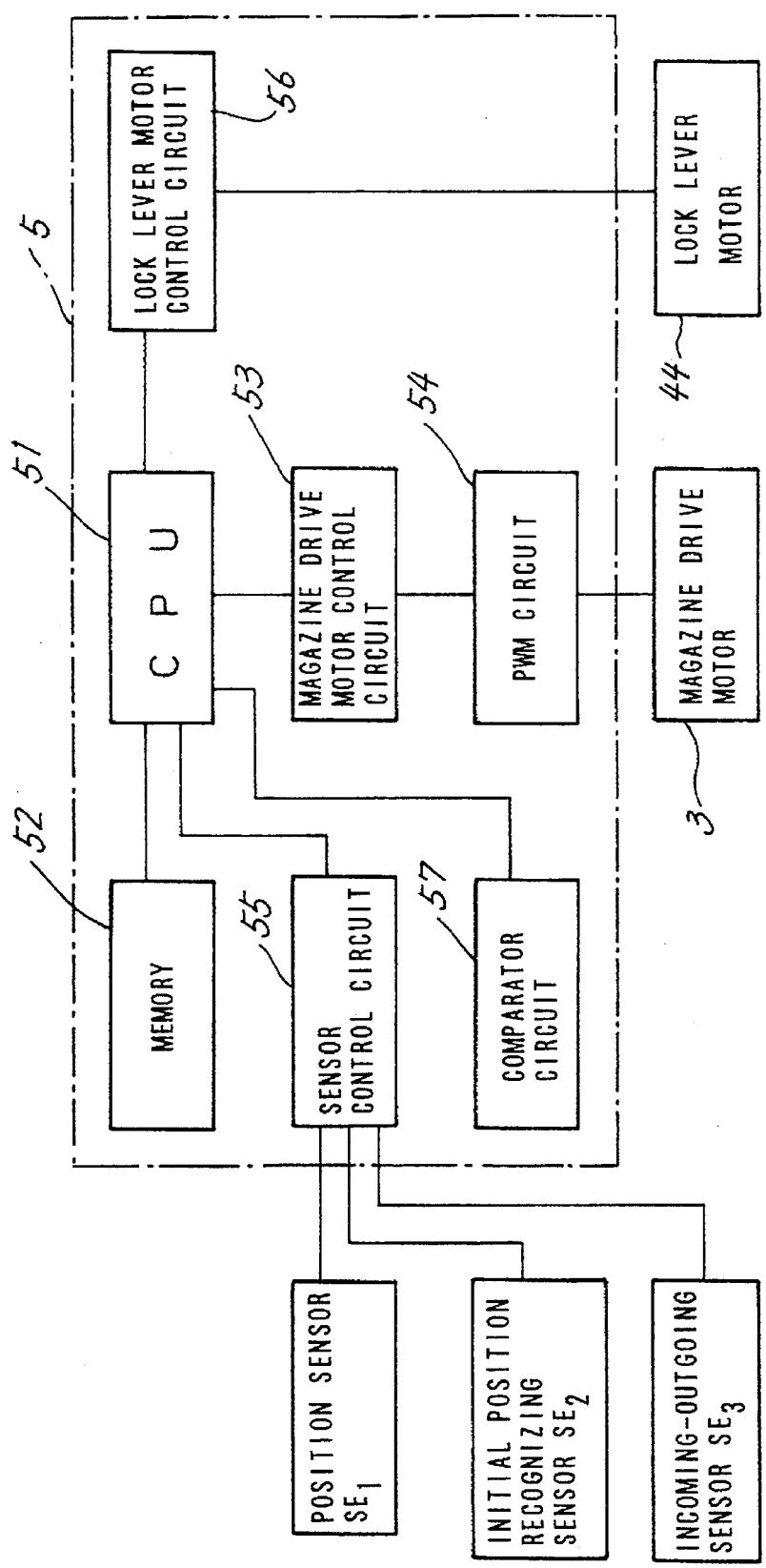
FIG. 4 is a circuit diagram of a control unit.

The control unit 5 shown in FIG. 4 controls the disk recording-playback device. The control unit 5 comprises a central processing circuit (CPU) 51 as its main component. Electrically connected to the CPU 51 are the memory 52, a magazine drive motor control circuit 53, sensor control circuit 55, lock lever motor control circuit 56, comparator circuit 57, etc. The control unit 5 further controls the recording-playback unit 18, loading of the disk D onto the magazine 2 or the unit 18 and unloading of the disk therefrom, and the operations to be commanded by the operation buttons 14 on the front panel although the control means and procedures will not be described and are not shown.

The memory 52 has an EEP-ROM and table with memory addresses. Control procedures and the like for the disk recording-playback device 1 are stored in other ROMs and RAMs.

The total number of disks stored in the magazine 2 is stored in the EEP-ROM regardless of the state of the power soruce of the device, based on the detection signals from the incoming-outgoing sensor SE3 provided for the inlet-outlet portion 13.

The table is divided as shown in Table 1. Stored in the first column are the upper limits of numbers of disks to be stored, as divided into several groups, and providing a basis for voltage changes for the speed reduction of the magazine. Respectively stored in the second and third columns are the pulse widths and pulse intervals of the voltage values corresponding to the respective groups and to be applied to the drive motor 3 for reducing the speed of the magazine.

TABLE 1

| Table No. | Upper limit | Pulse width | Pulse interval |
|---|---|---|---|
| 1 | 37 | 4 ms | 4 ms |
| 2 | 74 | 8 ms | 8 ms |
| 3 | 111 | 10 ms | 8 ms |
| 4 | 150 | 10 ms | 6 ms |

According to the present invention, the number of disks to be stored is divided into the groups of 0-37, 38-74, 75-111 and 112-150. Thus, the upper limits of numbers of disks in the respective groups are 37, 74, 111 and 150.

The pulse widths and pulse intervals for speed reductions corresponding to the respective groups are so determined that the average values of voltages to be applied to the drive motor 3 will be a first voltage value V1, second voltage value V2, third voltage value V3 and fourth voltage value V4 (V1<V2<V3<V4). When the drive motor 3 is driven at these voltage values in the respective four cases, the maga- zine rotates at substantially the same low speed. The average voltage values determined for the present embodiment are V1=2.5 V, V2=2.7 V, V3=2.9 V and V4=3.2 V.

If the voltage value to be applied to the drive motor 3 is definite regardless of difference of group, a difference in the number disks stored in the magazine 2 alters the total weight of the magazine 2 to vary the load on the drive motor, so that the rotational speed of the magazine 2 on speed reduction differs,resulting in the problem that the time required for the magazine 2 to stop after the speed reduction varies. To avoid this problem, the average voltage to be applied to the drive motor for a speed reduction is altered according to the number of disk stored in the magazine in the case of the present invention.

The magazine drive motor control circuit 53 is connected to the drive motor 3 via a PWM circuit 54 to drive the motor 3 at a desired average value for the rotation of the magazine 2. As will be described layer, it is possible to apply a reference voltage V to the drive motor 3, or to alter the pulse waveform for the speed reduction of the magazine 2 and thereby adjust the average voltage value to the applied to the motor 3 to V1, V2, V3 or V3.

The sensor control circuit 55 receives detection signals from the position sensor SE1, position recognizing sensor SE2 and incoming-outgoing sensor SE3 to detect the state of the device.

The value detected by the sensor SE3 is stored in the EEP-ROM as data as to the number of disks stored in the magazine 2.

The values detected by the position sensor SE1 and the position recognizing sensor SE2 are sent to and stored in the memory 52 as data for detecting the current position of the disk storing portion 13. The value detected by the position sensor SE1 is utilized also as data for measuring the amount of rotation of the magazine 2.

The comparator circuit 57 recognizes the number of disks accommodated in the magazine 2 and stored in the memory 52, and the corresponding table number. The circuit also calculates the number of pitches the magazine moved in rotation as will be described lataer.

The lock lever motor control circuit 56 controls the lock lever motor 44 to operate the cam mechanism 41 and drive the lock lever 4. When the magazine 2 is at rest, the lock lever 4 is in engagement with one of the recessed portion 25a of the stop ring 25 at the bottom of the magazine, locking the magazine 2 and preventing the magazine from rotating inadvertently. When the magazine 2 is to be rotated, the cam mechanism 41 is operated to disengage the lever 4 from the recessed portion 25a for unlocking. Further upon a particular disk storing portion 21 reaching the desired stop position, the cam mechanism 41 is operated to move the lock lever 41 toward the stop ring into engagement with one of the recessed portions 25a to lock the magazine 2 against rotation.

Description of Operation

Figure 5:
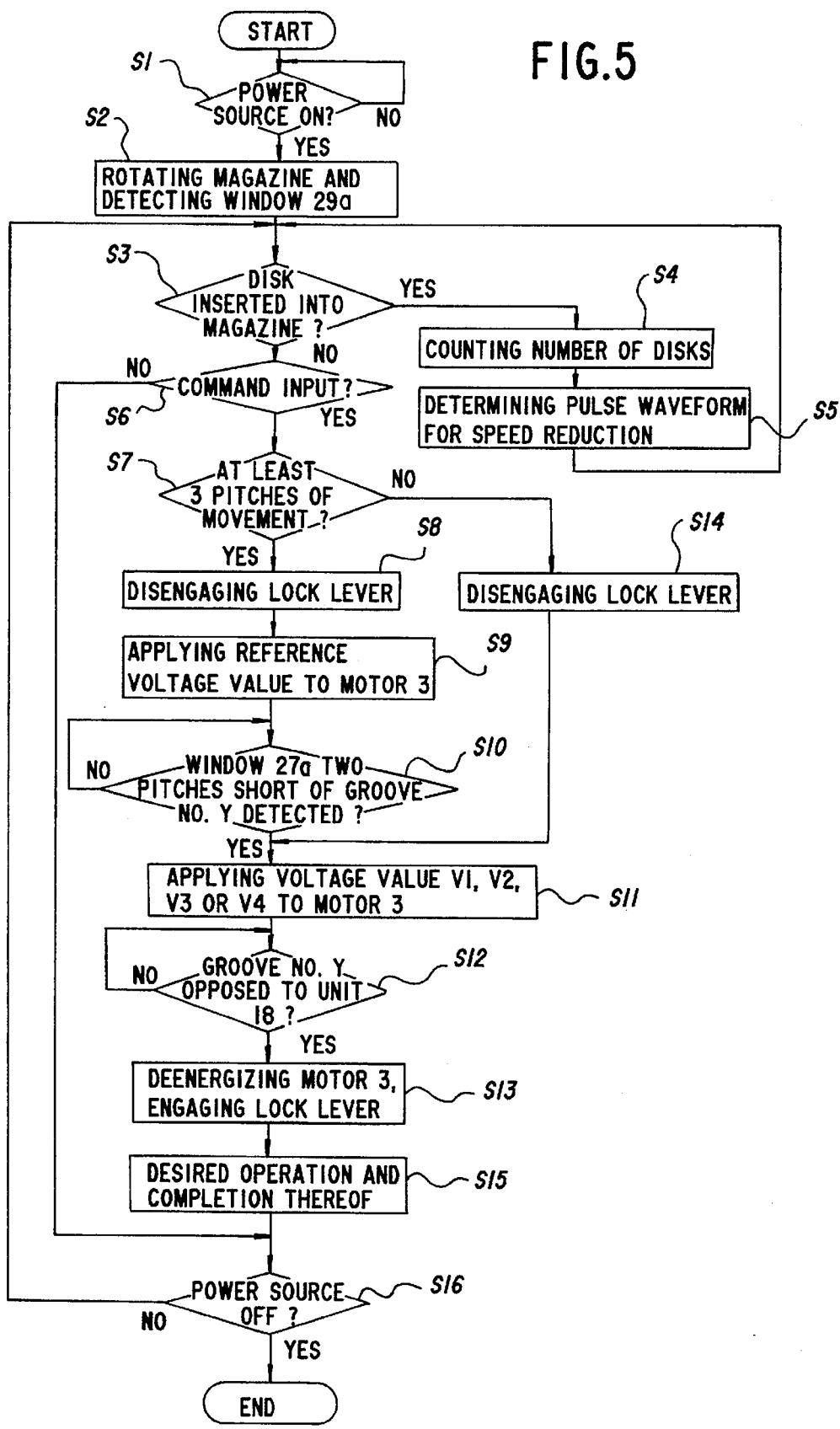
FIG. 5 is a flow chart showing the successions of operations for executing the control method of the invention.

The operation for rotating and stopping the magazine 2 of the disk recording-playback device 1 of the foregoing construction will be described with reference to the flow chart of FIG. 5. In the description to follow, the magazine 2 is to be slowed down at a position two groove (25a) pitches short of a desired stop position. In the case where the amount of rotation of the magazine 2 is less than 2 groove pitches, the drive motor 3 is to be driven at a voltage value for the speed reduction from the start.

When the device is unenergized, the lock lever 4 is in engagement with the recessed portion 25a of the stop ring 25.

When the power source is turned on to energize the device (step 1), the magazine 2 is first searched for the groove No. 1. This operation comprises rotating the cam mechanism 41 to disengage the lock lever 4 from the recessed portion 25a of the stop ring 25 and render the magazine 2 rotatable, thereafter rotating the magazine 2 by the drive motor 3, and detecting the window 29a in the initial position recognizing ring 29 at the position of the groove No. 1 by the sensor SE2 (step 2).

Upon the detection of the initial position, the cam mechanism 41 is operated to engage the lock lever 4 in another recessed portion 25a of the stop ring 25 again.

A disk D is inserted into the magazine 2 through the inlet-outlet portion 13 of the casing (step 3), whereupon the EEP-ROM counts the number of disks stored in the magazine by addition or subtraction (step 4). The group in which the number of disks is included is identified with reference to the table of Table 1, followed by the determination of the pulse waveform for a speed reduction of the magazine (step 5).

The position in which the magazine 2 is opposed to the recording-playback unit 18 will hereinafter be referred to as "stop position." The disk inlet-outlet portion 13 is opposed to the unit 18 with the magazine 2 interposed therebetween, so that the position where the magazine is at rest for the disk to be inserted into the magazine or to be discharged therefrom is also the same as the stop position with the present invention.

In the case where it is desired to use the disk D stored at the groove No. Y for recording or playback when the disk storing portion 21 with the groove No. X is located at the stop position, an operation command is input by the operation button (step 6). The comparator circuit 57 then recognizes the number of groove pitches between the input groove No. Y and the groove No. X with reference to the groove Nos. The sequence proceeds to step 8 if the magazine is to be moved at least three pitches, or to step 14 if the distance of movement (amount of rotation) is up to two pitches (step 7).

Figure 6:
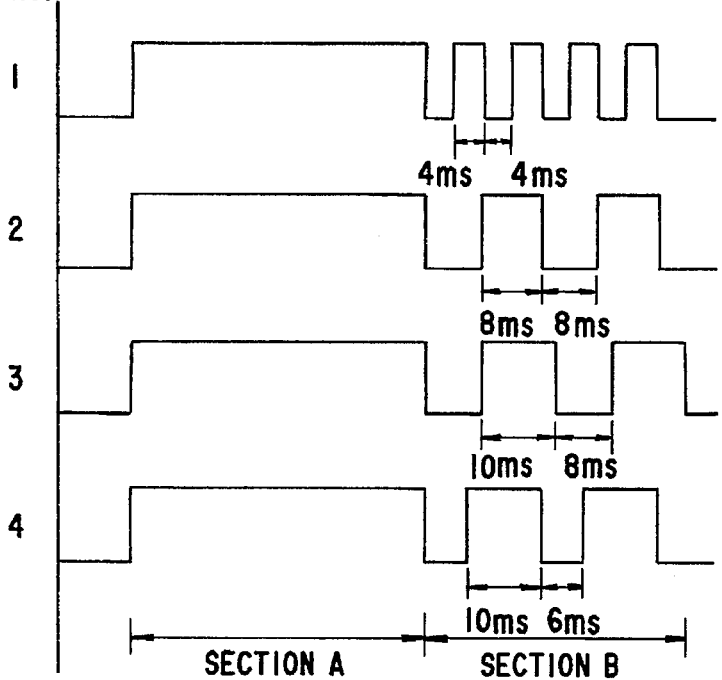
FIG. 6 is a diagram showing the pulse waveforms of voltage to be applied to a drive motor.
Figure 7:
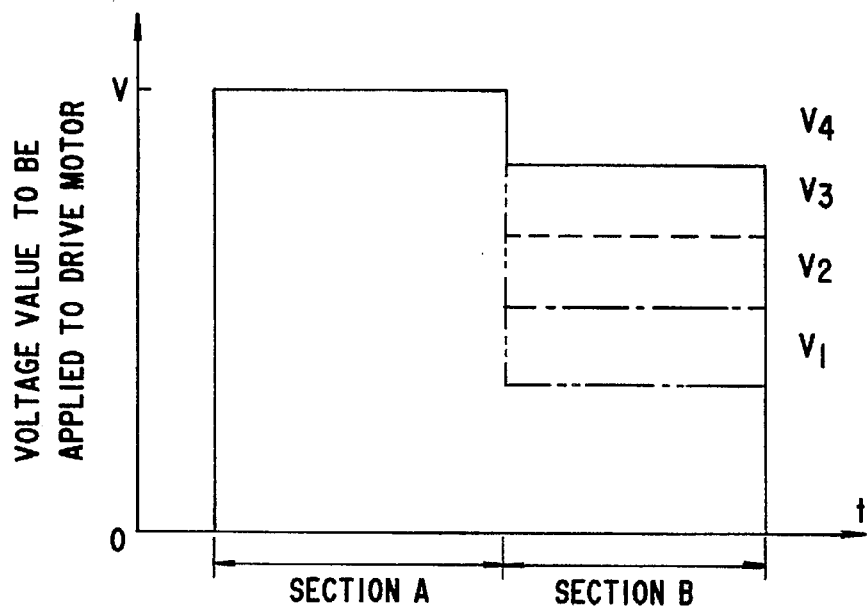
FIG. 7 is a graph showing the voltage values to be applied to the drive motor.

In the case of at least three pitches of movement, the lock lever motor is first driven to disengage the lever 4 from the stop ring 25 (step 8), whereupon the drive motor 3 is driven at the reference voltage V (V>V4)in step 9 (section A in FIG. 7) until the position sensor SE1 detects the detection window 27a at a position two pitches short of the groove No. Y. The position sensor SE1 then detects the passage of this window 27a (at the position two pitches short of the groove No. Y) through the stop position by counting up windows 27a (step 10), whereupon the voltage value to be applied to the drive motor 3 is changed to a voltage value (average value V1, V2, V3 or V4) corresponding to the pulse width and pulse interval (section B in FIG. 6) determined in step 5, and the voltage value is applied (step 11, section B in FIG. 7). The voltage value lower than the initial voltage value V reduces the energy to be applied to the drive motor 3, slowing down the magazine 2 for low-speed rotation. The drive motor 3 driven at the average voltage value V1, V2, V3 or V4 permits the magazine 2 to rotate at an approximately definite low speed upon the speed reduction regardless of the number of disks stored as previously stated.

The magazine 2 continues to rotate at the reduced speed, bringing the groove No. Y to the stop position. This is detected by the position sensor SE1 counting up detection windows 27a (step 12), whereupon the drive motor 3 is deenergized, and the lock lever motor is driven at the same time, engaging the lock lever 4 with one of the recessed portions 25a of the stop ring 25 to stop the magazine 2 with the groove No. Y at the stop position (step 13). Since the rotational speed of the magazine 2 has already been reduced, the magazine 2 can be brought to a stop smoothly with little or no impact acting on the lock lever 4, the stop ring 25, etc.

In the case of up to two pitches of movement (step 7), the drive motor 3 is driven to rotate the magazine at a reduced speed from the start. More specifically, the lock lever 4 is first disengaged from the stop ring 25 (step 14), and the drive motor 3 is driven at an average voltage value (V1, V2, V3 or V4 of section B in FIG. 7) based on the pulse waveform (FIG. 6, section B) determined in step 5 according to the number of stored disks (step 11). As previously stated, the magazine 2 rotates at an approximately definite low speed regardless of the number of stored disks. The position sensor SE1 detects the groove No. Y as opposed to the stop position (step 12), whereupon the motor 3 is deenergized, and the lock lever motor is driven at the same time, engaging the lock lever 4 with the recessed portion 25a of the stop ring 25 to stop the magazine with the groove No. Y at the predetermined stop position (step 13). Since the rotational speed of the magazine 2 has already been reduced, the magazine 2 can be brought to a stop smoothly with little or no impact acting on the lock lever 4, the stop ring 25, etc.

After the magazine 2 has been stopped, a desired operation, such as recording, playback, loading of a disk D onto the magazine or unloading of the disk therefrom, can be performed (step 15).

When the completion of the desired operation is to be followed by an operation, such as insertion or discharge of a disk D, recording or playback, again, the sequence returns to step 3.

When the power source for the device is turned off (step 16), the operations described are completed. Incidentally, the number of disks accommodated in the magazine stored in the EEP-ROM is retained while the power source is off.

Although the number of disks in the magazine is detected by the EEP-ROM with the foregoing embodiment, the means for detecting the number is not limited thereto. For example, each of the storing portions of the magazine may be provided with a sensor for measuring the number, or the total weight of the magazine may be measured by a strain gauge. It is also possible to drive the drive motor at the reference voltage V or like definite voltage, measure the time taken for the magazine to rotate through a predetermined angle, and determine the number of disks from the measurement.

The number of disks to be stored in the magazine, the numbers of disks providing a basis for changing the voltage value, number of groups thereof, the position of speed reduction, etc. are not limited to those of the foregoing embodiment.

Furthermore, the construction of the disk recording-playback device and the method of controlling the device, other than the method of controlling the magazine for stopping are not limited to those of the embodiment.

The control method of the invention is applicable to existing disk recording-playback devices having a rotary disk storing magazine merely when the control unit thereof is replaced.

According to the method of the invention for controlling the disk storing magazine, the magazine in rotation is first slowed down at a position a small distance short of the stop position and then brought to a stop, so that the magazine can be brought to a halt with a diminished impact.

Consequently, the magazine can be rotated at a high speed immediately before it is stopped at the specified position. This shortens the time required for the rotation.

In order to control the rotational speed of the magazine to a definite low speed for a speed reduction regardless of the number of stored disks, the voltage value to be applied to the drive motor 3 is altered in accordance with the number of stored disks. The magazine can therefore be brought to a stop with constant smoothness regardless of the number of stored disks.

Further when the magazine is slowed down by altering the pulse waveform of the voltage to be applied to the drive motor 3, the motor 3 can be subjected to a speed reduction while permitting the motor to retain the same torque. This assures the magazine of smooth rotation.

Apparently, the present invention can be modified and altered by one skilled in the art without departing from the spirit and scope of the invention. Such modifications and alterations are included within the scope of the invention as set forth in the appended claims.

What is claimed is:

1. A method for controlling a disk storing magazine having a plurality of disk storing portions to rotate the magazine by a drive motor and stop a specified disk storing portion at a predetermined stop position comprising the steps of:

rotating the magazine in a predetermined speed;

reducing the rotational speed of the magazine in rotation to a definite low speed upon the magazine reaching a position which is at a small distance near the stop position; and stopping the magazine upon the specified disk storing portion moving to the predetermined stop position at the low speed.

2. A method for controlling a disk storing magazine having a plurality of disk storing portions to rotate the magazine by a drive motor and stop a specified disk storing portion at a predetermined stop position comprising the steps of:

detecting the number of disks stored in the magazine to judge whether the number of disks is greater or smaller than a predetermined number and one of:

(a) applying a reference voltage value to the drive motor to initiate the magazine into rotation when the number of disks is recognized to be greater, changing the voltage to be applied to the drive motor from the reference voltage value to a first voltage value lower than the reference voltage value for a speed reduction upon the magazine reaching a position which is at a small distance near the stop position, and thereafter stopping the magazine at the predetermined stop position, and (b) applying the reference voltage value to the drive motor to initiate the magazine into rotation when the number of disks is recognized to be smaller, changing the voltage to be applied to the drive motor from the reference voltage value to a second voltage value still lower than the first voltage value for a speed reduction upon the magazine reaching a position which is at a small distance near the stop position, and thereafter stopping the magazine at the predetermined stop position.

3. A method for controlling the disk storing magazine as defined in claim 2, wherein the step of applying the reference voltage value includes the step of changing the voltage value by altering at least one of a pulse width and a pulse period of the voltage waveform to be applied to the drive motor.

4. A method for controlling the disk storing magazine as defined in claim 1, wherein the step of reducing the rotational speed of the magazine includes the step of changing the voltage value by altering at least one of a pulse width and pulse period of the voltage waveform to be applied to the drive motor.

5. A method for controlling the disk storing magazine as defined in claim 1, wherein the rotational speed of the magazine is reduced when it is detected that the magazine reaches the position which is at a small distance near the stop position.

* * * * *